(12) United States Patent
Forsten et al.

(10) Patent No.: US 8,280,422 B2
(45) Date of Patent: Oct. 2, 2012

(54) INTER-SYSTEM COMMUNICATIONS IN MOBILE COMMUNICATIONS SYSTEM

(75) Inventors: Tapani Forsten, Naantali (FI); Harri Jokela, Helsinki (FI); Risto Mäkinen, Espoo (FI)

(73) Assignee: Teliasonera AB, Stockholm (SE)

( * ) Notice: Subject to any disclaimer, the term of this patent is extended or adjusted under 35 U.S.C. 154(b) by 606 days.

(21) Appl. No.: 12/223,515

(22) PCT Filed: Jan. 31, 2007

(86) PCT No.: PCT/FI2007/050054
§ 371 (c)(1),
(2), (4) Date: Jan. 21, 2009

(87) PCT Pub. No.: WO2007/088247
PCT Pub. Date: Aug. 9, 2007

(65) Prior Publication Data
US 2009/0239527 A1 Sep. 24, 2009

(30) Foreign Application Priority Data
Feb. 1, 2006 (FI) .................................... 20065076

(51) Int. Cl.
*H04W 4/10* (2009.01)
(52) U.S. Cl. .................................... 455/518; 455/426.1
(58) Field of Classification Search .......... 455/517–528, 455/90.2, 426.1, 466, 414.1–414.4, 465; 370/433, 340, 310, 312, 338, 260–271, 389, 370/466, 352
See application file for complete search history.

(56) References Cited

U.S. PATENT DOCUMENTS

| | | | |
|---|---|---|---|
| 2002/0196781 A1 | 12/2002 | Salovuori | |
| 2004/0032843 A1 | 2/2004 | Schaefer et al. | |
| 2004/0190468 A1* | 9/2004 | Saijonmaa | 370/312 |
| 2004/0202117 A1 | 10/2004 | Wilson et al. | |
| 2007/0123284 A1* | 5/2007 | Schliwa-Bertling et al. | 455/518 |
| 2008/0171533 A1* | 7/2008 | Sharp et al. | 455/410 |

FOREIGN PATENT DOCUMENTS
EP 1253770 A2 10/2002
(Continued)

OTHER PUBLICATIONS

3GPP TS23.228, "IP Multimedia Subsystem; Stage 2 (Release 7)", version 7.1.0 (Sep. 2005) $3^{rd}$ Generation Partnership Project (3GPP™).

(Continued)

*Primary Examiner* — Ajit Patel
*Assistant Examiner* — Erica Navar
(74) *Attorney, Agent, or Firm* — Cozen O'Connor

(57) ABSTRACT

The present invention relates to a method of arranging interworking for a communications system comprising a PMR (private mobile radio) system part and a PLMN (public land mobile network) system part. The system comprises a mobile intermediate device capable of communicating with the PMR system part and the PLMN system part and comprising a converter for performing protocol conversion between the PMR system part and the PLMN system part, the method comprising: detecting in the intermediate device a need for inter-system transfer from a source system part to a target system part, performing by the converter conversion for an information unit from a source system to a format appropriate in the target system part; and transmitting the converted information unit to the target system part.

9 Claims, 3 Drawing Sheets

FOREIGN PATENT DOCUMENTS

| | | |
|---|---|---|
| EP | 1655977 A1 | 5/2006 |
| WO | WO 02/089501 A | 11/2002 |
| WO | WO 03/107619 A1 | 12/2003 |

OTHER PUBLICATIONS

3GPP TS26.071, "Mandatory speech CODEC speech processing functions; AMR speech CODEC; General description", version 6.0.0 (Dec. 2004), (3GPP™).

3GPP TS26.090, "Mandatory Speech Codec speech processing functions; Adaptive Multi-rate (AMR) speech codec; Transcoding functions (Release 6)", version 6.0.0, (Dec. 2004), (3GPP™).

3GPP report 3GPP TR 23.979, v. 6.2.0, "Push-to-talk over Cellular (PoC) services; Stage 2 (Release 6)", (Jun. 2005), (3GPP™).

OMA specification "Push to talk over Cellular (poC)-Architecture", Candidate Version 1.0-05 Aug. 2005, Open Mobile Alliance Ltd.

OMA specification "OMA PoC Control Plane", Candidate Version 1.0—Nov. 4, 2005, Open Mobile Alliance Ltd.

OMA specification "OMA PoC User Plane", Candidate Version 1.0—Nov. 4, 2005, Open Mobile Alliance Ltd.

ETSI specification EN 300 392-1, "Terrestrial Trunked Radio (TETRA); Voice plus Date (V+D); Part 1; General network design", V1.3.1 (Jun. 2005).

ETSI specification EN 300 392-33, "Terrestrial Trunked Radio (TETRA); Voice plus Date (V+D); Part 3: Interworking at the Inter-System Interface (ISI); Sub-part 3: Additional Network Feature Group Call (ANF-ISIGC)", V1.2.1 (Jan. 2004).

ETSI EN 300 395-2, "Terrestrial Trunked Radio (TETRA); Speech codec for full-rate traffic channel; Part 2:TETRA codec", V1.3.1, (Jan. 2005), (3GPP™).

ETSI EN 300 396-3 "Terrestrial Trunked Radio (TETRA): Technical requirements for Direct Mode Operation (DMO); Part 3: Mobile Station to Mobile Station (MS-MS) Air Interface (AI) protocol", V1.2.1 (Dec. 2004).

ETSI EN 300 395-1 V2.1.1 (Jan. 2005) Terrestrial Trunked Radio (TETRA); Speech codec for full-rate traffic channel; Part 1; General description of speech functions.

ETSI TS 101 747 V1.1.1 (Jul. 2001) Terrestrial Trunked Radio (TETRA); Voice plus Data (V+D); IP Interworking (IPI).

* cited by examiner

INTER-SYSTEM COMMUNICATIONS IN MOBILE COMMUNICATIONS SYSTEM

PRIORITY CLAIM

This is a U.S. national stage of application No. PCT/FI2007/050054, filed on 31 Jan. 2007. Priority is claimed on the following application: Country: Finland, Application No.: 20065076, Filed: 1 Feb. 2006, the content of which is incorporated here by reference.

FIELD OF THE INVENTION

The present invention relates to inter-system communications in a mobile communications system, and more particularly to inter-system communications in a system comprising a PMR (private mobile radio) system part and a PLMN (public land mobile network) system part.

BACKGROUND OF THE INVENTION

One special feature offered in mobile communications systems is group communication. Conventionally group communication has been available only in trunked mobile communications systems, such as Professional Radio or Private Mobile Radio (PMR) systems, such as TETRA (Terrestrial Trunked Radio), which are special radio systems primarily intended for professional and governmental users. Group communication is becoming available also in public mobile communications systems. New packet-based group voice and data services are being developed for cellular networks, especially in GSM/GPRS/UMTS network evolution, wherein the approach is based on the idea of a group communication service being provided as a packet-based user or application level service so that the underlying cellular network only provides the basic connections (i.e. IP connections) between the group communications applications in user terminals and the group communication service. When this approach is employed in push-to-talk communication, the concept is also referred to as a push-to-talk over cellular (PoC) network.

Generally, in group voice communication with a "push-to-talk, release-to-listen" feature, a group call is based on the use of a pressel (PTT, push-to-talk switch) in a telephone as a switch: by pressing a PTT the user indicates his or her desire to speak, and the user equipment sends a service request to the network. The network either rejects the request or allocates the requested resources on the basis of predetermined criteria, such as the availability of resources, priority of the requesting user, etc. At the same time, a connection is established also to all other active users in the specific subscriber group. After the voice connection has been established, the requesting user may talk and the other users may listen on the channel. When the user releases the PTT, the user equipment signals a release message to the network, and the resources are released. Thus, the resources are reserved only for the actual speech transaction or speech item, instead of reserving the resources for a "call".

PMR systems are widely employed by authorities and specific user groups. However, it is not possible to communicate with a PMR group without an appropriate PMR capable terminal. Such communications need could arise for instance when additional volunteers help officials to locate a missing person. A patent application publication US 2002/0196781 discloses a method of routing calls to a TETRA system. There is a gateway between the TETRA network (connected to the TETRA core network exchange element) and an IP network. A terminal in the IP network (for instance in a mobile network connected to the IP network) may communicate with the TETRA system by emulating a TETRA terminal, whereby the TETRA protocol data is transferred between the TETRA network and the terminal over the IP. Thus, the terminals outside the TETRA network need to be capable of at least encoding and decoding data according to the TETRA protocol.

BRIEF DESCRIPTION OF THE INVENTION

An enhanced solution for enabling inter-system communications between PLMN and PMR systems is now provided. Various aspects of the invention include a method, a mobile communications device, and a system, which are characterized by what is stated in the independent claims. Various embodiments of the invention are disclosed in the dependent claims.

According to an aspect of the present invention a mobile interworking device facilitating inter-system PMR-PLMN communications is provided. Such communications device comprises a PMR (private mobile radio) communications unit for PMR communications with a PMR system element, such as a PMR terminal or a network element, and a PLMN (public land mobile network) communications unit for PLMN communications with a PLMN system element. The mobile interworking device comprises a converter for performing conversion between PMR communications and PLMN communications, wherein the converter is arranged to perform, for an information unit requiring inter-system transfer, a conversion between a format used for PMR communications and a format used for PLMN communications.

The definition "PMR" is to be understood broadly to refer to any private or separate mobile radio system and the definition "PLMN" is to be understood broadly to refer to any public mobile services system. The conversion between the PMR and PLMN formats may involve change of media encoding format and/or transmission protocol. The conversion may be direct or indirect; it may involve one or more intermediate speech coding formats, for instance.

According to an embodiment, the communications device is arranged to detect the need for inter-system transfer on the basis of a source system part communications identifier associated with at least one target system part communications identifier.

According to an embodiment, the communications device is arranged to provide inter-system group communications between one or more PLMN system elements and one or more PMR system elements.

The invention and its embodiments provide various advantages. In particular, communications may be arranged by the present mobile interworking device between PMR and PLMN system elements utilizing different transmission technologies. For instance, in PMR environment direct communication may be arranged between one or more PMR terminals and the mobile inter-working device to further facilitate communication to a PLMN system. By having the present interworking device, it is possible to provide communications in a system comprising both PMR terminals and PLMN terminals without requiring any additional functionality in these terminals. For instance, already existing TETRA terminals may be used for voice group communication with GSM/GPRS PoC terminals without any PMR functionality. Such inter-system voice groups may be established by an interworking device according to an embodiment of the invention. A further significant advantage is that already existing PMR and PLMN features and protocols may be applied and there is no need for modifications in PMR or PLMN networks. As regards the PoC service, a significant advantage of the invention is that no new functionality is required to the PoC server system.

BRIEF DESCRIPTION OF THE DRAWINGS

In the following, the invention will be described in greater detail by means of preferred embodiments and with reference to the attached drawings, in which.

DETAILED DESCRIPTION OF THE INVENTION

The present invention is applicable to arranging interworking between any PMR and PLMN systems, such as TETRA or LMR (Land Mobile Radio) systems and PoC systems. The invention is also applicable in systems wherein communication is arranged via a circuit-switched and/or packet-switched connection. Some embodiments disclosed below are depicted using a TETRA system and a PoC service carried over GPRS packet radio service of the GSM/UMTS systems as examples, without limiting the invention solely to these systems.

Figure 1:
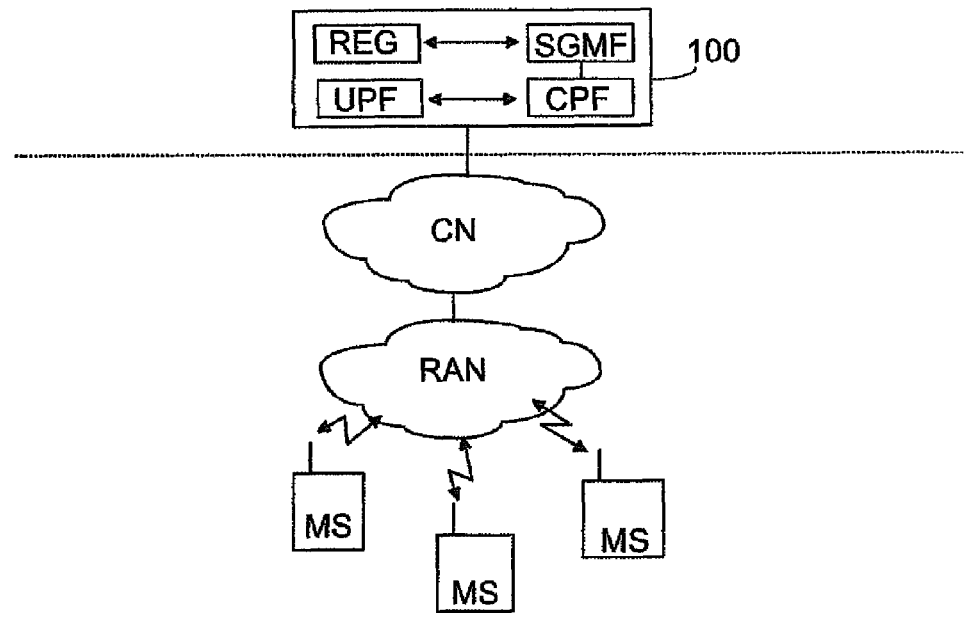
FIG. 1 illustrates a general concept of a PoC network arrangement.

FIG. 1 illustrates a general concept of a PoC network arrangement. In FIG. 1, a packet based group communication system 100 having separated control-plane functions CPF and user-plane functions UPF is provided on top of the mobile network. The mobile network below comprises a core network CN and a radio access network RAN for offering a radio connection for the mobile stations MS. The cellular network may be based on any second or third or further generation mobile network, such as a GSM/GPRS network or a UMTS (3GPP) network. The radio access network RAN can also be implemented as a wireless local area network WLAN. The type and structure of the wireless network beneath the PoC network arrangement is, however, irrelevant to the implementation of the PoC service, as far as a packet data connection is available for the wireless network via the wireless network. Thus, any packet-switched wireless network can be used as a bearer service for the PoC service.

The term "group", as used herein, refers to any logical group of two or more users for participating in the same group communication, e.g. a speech call. In PMR systems, the members of the communication group often belong to the same organization, but in public mobile communications systems, like the PoC service, also private persons can establish communication groups of their own. Naturally, the same user may be a member of more than one communication group.

The group communication system 100 may be embodied as a server system comprising one or more servers. Subscriber communication directed to the server system is typically routed via a proxy, since the PoC service does not usually enable peer-to-peer communication between terminals and server(s). Conceptually, the group communication server system may comprise control-plane functions CPF and user-plane functions UPF providing packet mode server applications which communicate with the group communication client application(s) in the mobile stations MS over the IP connections provided by the communication system. This communication includes signalling packets and voice or data communication packets.

The user-plane function(s) UPF is responsible for distributing of data or speech packets to the mobile stations MS according to their group memberships and other settings. The UPF forwards traffic only between valid connections programmed by the CPF. In the case of speech communication, it may be based on a voice over IP (VoIP) protocol, and/or a Real-time Transport Protocol (RTP). The basic of the user-plane operation typically includes that all the data or speech packet traffic from a sending user is routed to the UPF which then delivers the packet traffic to all receiving users in the group, using a suitable technique, such as multicasting or multiple unicasting (multi-unicast).

The CPF function is responsible for control-plane management of the group communication. This may include, for example, managing user activity and creation and deletion of logical user-plane connections with an appropriate control protocol, such as Session Initiation Protocol SIP. The user may also perform group attachment and group detachment with the CPF using control signalling, e.g. the SIP protocol. The CPF also carries out user registration and authentication.

The group communication server system 100 may also include a subscriber and group management function (SGMF) for managing subscriber and group data. It may also provide specific tools and interfaces needed for subscriber and group provisioning. The system 100 may also include a register REG for storing all provisioned data in the group communication system. The group communication server system 100 may further include a presence service (PresS) functionality, which may be provided on the infrastructure side by means of a presence server PS. The mobile stations MS, in turn, thus comprise presence client applications. The presence information of a user's device may be delivered to other user devices within a communication group.

Figure 2:
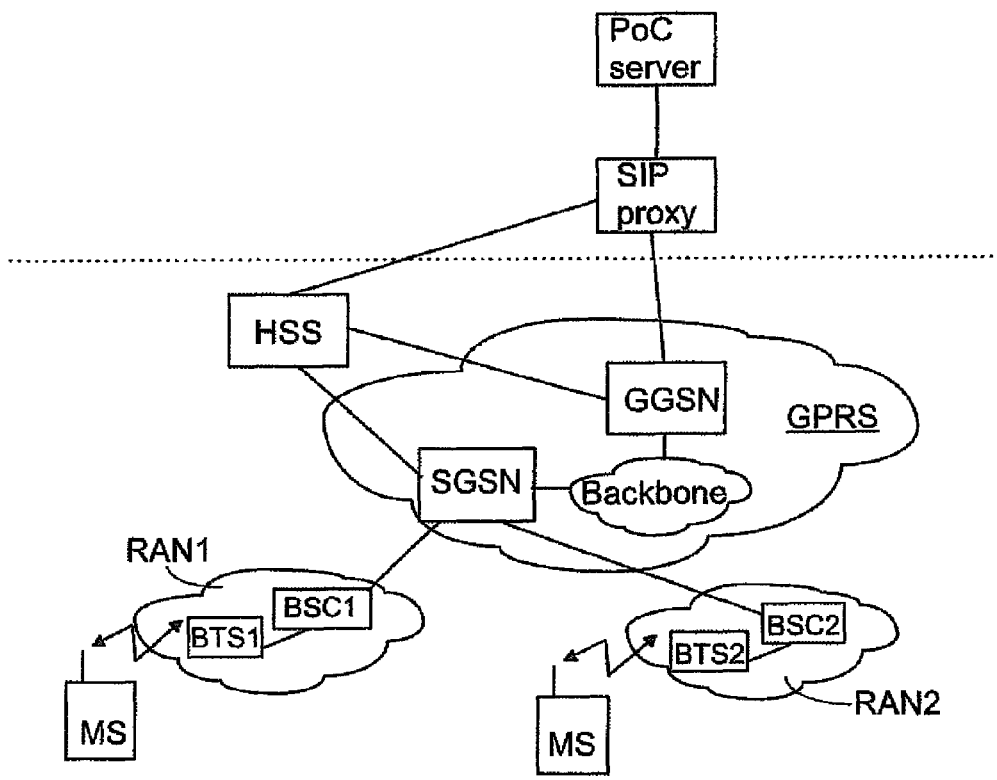
FIG. 2 illustrates PoC network functions in more detail in connection with a GSM/GPRS network.

FIG. 2 shows only some of the network elements of a GSM/GPRS network. GSM/GPRS networks comprise a great number of other network elements as well, but the appreciation of the invention does not require these elements to be disclosed herein.

Only two radio access networks RAN1 and RAN2 of the GSM network are shown in FIG. 2. Each radio access network comprises at least one base station controller BSC(1/2) and typically several base transceiver stations BTS(1/2) connected to each base station controller BSC, the base station controller BSC controlling radio frequencies and channels of each base transceiver station BTS connected to it. User terminals or mobile stations MS of the mobile network are connected to at least one base transceiver station BTS via a radio frequency channel.

Base station controllers BSC, in turn, are connected both to a circuit-switched (CS) GSM core network and to a packet-switched (PS) GPRS network, only the latter being disclosed herein in more detail. For a packet-switched connection, the BSC is further coupled to a Packet Control Unit (PCU). The PCU is coupled to a Serving GPRS Support Node (SGSN) via a Gb interface for providing a bearer path and a signaling interface between the PCU and the SGSN.

In addition to the serving nodes SGSN, the GPRS packet radio system can comprise several gateway nodes GGSN (Gateway GPRS Support Node). Typically several serving nodes SGSN are connected to one gateway node GGSN. The serving node SGSN is in contact with a mobile station MS through a radio network UTRAN. A task of the serving node SGSN is to detect mobile stations capable of packet radio connections in its service area, to transmit and receive data packets from said mobile stations and to track the location of the mobile stations in its service area. Records related to packet radio services and comprising subscriber-specific packet data protocol contents are also stored in a home subscriber server HSS.

The gateway node GGSN acts as a gateway between the GPRS packet radio system and an external data network PDN (Packet Data Network). The GGSN can also be connected directly to a private company network or to a host, like the PoC communication server system via the SIP proxy, as depicted in FIG. 2. Data packets transmitted between the gateway node GGSN and the serving node SGSN are always encapsulated according to the gateway tunneling protocol GTP.

Accordingly, the GSM/GPRS network, known as such, provides an IP-based communication infrastructure, on top of which the PoC service is implemented as data transfer between the PoC group communication server system and PoC client applications residing in the mobile stations MS. The GGSN is connected to the PoC group communication server system via the SIP proxy, whereby the SIP proxy routes the VoIP packets between the mobile stations MS and the PoC group communication server system. It is to be noted that the IMS entities, such as CSCFs (Call State Control Function) communicating with the PoC group communication server system, are not illustrated in detail in FIG. 2. For more details on IMS entities, a reference is made to 3GPP specification TS23.228, *"IP Multimedia Subsystem; Stage 2 (Release 7)"*, version 7.1.0, September 2005; for Instance FIG. 4.

Figure 3:
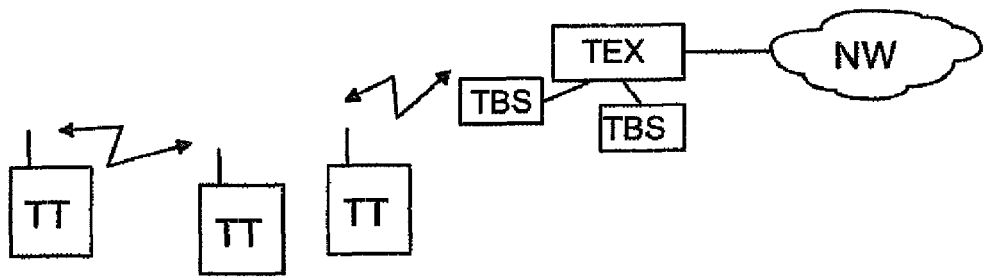
FIG. 3 illustrates basic elements of a TETRA system.

FIG. 3 illustrates basic elements of a TETRA system. The TETRA system comprises at least one digital exchange or switch TEX, base station functions and radio interface management for establishing a bi-directional data transmission connection over the radio interface to TETRA terminals or TETRA mobile stations TT. A packet-switched data transmission connection can be established between the TETRA terminals TT and the TETRA network over the interface RO defined in TETRA specifications. Connections to various external networks, such as ISDN, PSTN, PLMN, or IP network may be arranged from the TETRA exchange TEX. TETRA base stations TBS provide radio interface connections for the TETRA terminals TT and are connected to the switch TEX.

The switches TEX and the base stations TBS connected thereto form a switching and management infrastructure SwMI, which controls the assignment of speech items between calls. Furthermore, typically one or more dispatcher workstations are connected to the switching and management infrastructure. The dispatcher workstations are capable of establishing a connection to a terminal TT and manage and control calls of single subscribers and groups. Besides infrastructure communication via the base stations TBS and exchange TEX, the TETRA terminal TT may communicate directly (Direct Mode) with one or more other TETRA terminals TT, enabling to establish a group call between a number of TETRA terminals TT.

Figure 4:
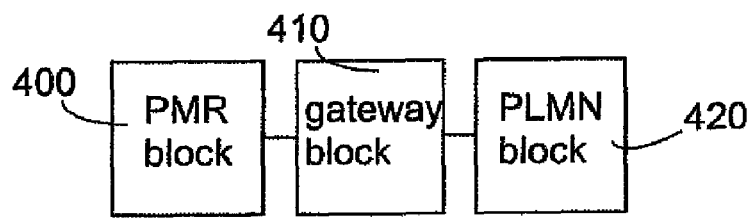
FIG. 4 illustrates blocks for an interworking device according to an embodiment of the invention.

FIG. 4 illustrates main functional blocks for an interworking system or device according to an embodiment of the invention. A PMR block 400 may be a communications unit providing wireless PMR communications and a PLMN block 420 may be a communications unit providing wireless PLMN communications. A gateway block 410 or a converter is provided between the PMR block 400 and the PLMN block 420 and carries out conversion between one or more applied PMR formats and PLMN formats. It is to be noted that the blocks in FIG. 4 are only for illustrative purposes for separating PMR functions, PLMN functions, and gateway functions, but these functions may be implemented in various ways, for instance the gateway functions may be implemented in the PMR block 400 and/or the PLMN block 420. In one embodiment, the gateway block 410 is a converter providing at least conversion between the PMR specific protocol and/or media format and PLMN protocol and/or media format. Such converter may be provided by a PMR and/or a PLMN coder or applied in the inter-system communications instead of a conventional PMR and/or a PLMN coder applied for intra-system communications. These blocks may be provided in a PLMN-PMR interworking device or in multiple devices. In one embodiment the blocks are arranged in a portable and mobile interworking device that may be connected to a PMR network whenever necessary to enable communications between the PMR terminals and PLMN terminals. It is to be noted that the gateway functionality may be arranged only to one direction, or the gateway device may support voice group data transfer only to one direction (from PMR to PLMN or from PLMN to PMR), since it is not always necessary to be able to have two-way voice group transfer capability. In the following some embodiments of the invention are illustrated in connection with TETRA-PoC inter-system voice group communications but following features may be applied also in other PMR-PLMN inter-system communications.

Figure 5:
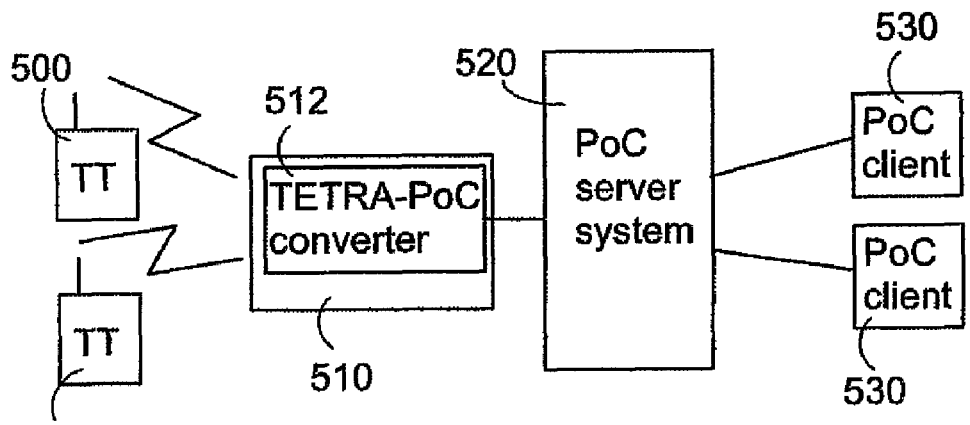
FIG. 5 illustrates a TETRA-PoC group voice communications system according to an embodiment of the invention.

FIG. 5 illustrates an embodiment of the invention in which protocol conversion between group voice communication in a TETRA system and a PoC system is provided. There is an element or a device 510 with TETRA-PoC converter 512 providing conversion between TETRA speech traffic and PoC voice group traffic. In one embodiment the converter 512 directly communicates with the TETRA terminals 500, i.e. is arranged to communicate by the TETRA direct mode and provides conversion for TETRA air interface traffic. The device 510 may also be arranged to communicate with TETRA base stations TBS. In one embodiment the device 500 supports at least a part of features in TETRA specifications specifying communication within the TETRA system. Hence, the device 610 may function as a conventional TETRA terminal TT (500) in view of the TETRA network and other TETRA terminals.

The interworking device 510 with the PoC-converter 512 is arranged to communicate with a PoC server system 520, such as the system 100 illustrated in FIG. 1, providing group voice services for PoC clients 530, i.e. for GSM/GPRS mobile stations MS with PoC capabilities. The device 510 may be configured to function as a conventional GSM/GPRS mobile station MS communicating with GSM/GPRS network and as a conventional PoC client in view of the PoC server system 520, i.e. the device 510 may be equipped with necessary standardized protocol stacks and applications to enable such communications with the PLMN system side. The underlying communication infra-structure between the TETRA-PoC converter device 510 and the PoC server system is not shown in FIG. 5 but FIGS. 1 and 2 disclosed the main elements of the GSM/GPRS system providing packet data transfer by a PDP (packet data protocol) context and the PoC system. The embodiment of FIG. 5 enables to establish voice group communications between TETRA terminals TT and widely used GSM/GPRS terminals MS.

The interworking device 510 may comprise the basic blocks already illustrated in connection with FIG. 4. The interworking device 510 in one embodiment comprises a TETRA terminal part (400), a GSM/GPRS/PoC terminal part (420), and interworking means (410) for user data conversion and for arranging necessary control features for inter-system communications, these units not being shown in FIG. 5. The device 510 may comprise a TETRA transceiver, a GSM/ GPRS transceiver, and necessary hardware and software for TETRA and GSM/GPRS communications. Computer program codes stored in a memory of the interworking device 510 and executed in a processing unit of the interworking device 510 (or some other PLMN/PMR interworking device) may be used for causing the device 510 to implement means for providing inventive functions relating to arranging PLMN/PMR interworking, some embodiments of the inventive functions being illustrated further below. Hardware solutions or a combination of hardware and software solutions may also be used to implement the inventive functions.

The converter 512 functionality illustrated in FIG. 4 may provide the conversion between the speech encoding format applied in TETRA and the speech encoding format applied in PoC communications. The converter 512 may comprise a TETRA encoder and decoder and PoC speech item encoding and decoding means according to the applied PoC speech codec type for arranging transmission and reception of PoC speech items. In one embodiment the converter 512 is arranged to perform speech conversion between the ACELP (Algebraic Code-Excited Linear Predictive) coding format applied in the TETRA system and the narrowband or wideband AMR applied for 3GPP PoC transfer or the EVRC (Enhanced Variable Rate Coder) codec for the 3GPP2 PoC transfer. General description of the AMR codec is available in the 3GPP specification TS26.071, *"Mandatory speech CODEC speech processing functions; AMR speech CODEC; General description"*, version 6.0.0 (2004-12).

AMR transcoding features are described in the 3GPP specification TS 26.090 *"Mandatory Speech Codec speech processing functions; Adaptive Multi-rate (AMR) speech codec; Transcoding functions (Release 6)"*, version 6.0.0 (2004-12). More information on TETRA speech coding features, including a block diagram of the TETRA speech codec, is available in the ETSI specification EN 300 395-2, *"Terrestrial Trunked Radio (TETRA); Speech codec for full-rate traffic channel; Part 2: TETRA codec"*, V1.3.1 (2005-1). The conversion may be direct, whereby the converter 512 is an ACELP-AMR transcoder.

Instead of direct conversion between the PMR and the PLMN specific formats, in accordance with another embodiment the conversion between the PMR format and the PLMN format involves one or more intermediate formats. For instance, in speech communications from TETRA to GSM/GPRS PoC system, the interworking device 510 may be arranged to decode TETRA speech items into a digital intermediate format. The speech information in the intermediate format may then be coded to AMR format for PoC transfer by AMR encoder.

In one embodiment, standardized AMR encoders and decoders and EVRC encoders and decoders are applied in the interworking device 510. In one embodiment the converter 512 may further comprise a transcoder performing conversion between the 13 bit uniform PCM (Pulse Code Modulation) signal from/to the AMR de-/encoder to the format 16 bit linear PCM to/from the TETRA ACELP en-/decoder.

However, application of the present invention is not limited to any specific codec type but may be applied to provide conversion between any current or future coding methods applied in PMR systems and PLMN systems.

In one embodiment, the gateway block 410, or in the embodiment of FIG. 5 the interworking device 510, or in particular the converter 512, is arranged to store the speech data items temporarily in a (buffer) memory in the device 510 before transmission to the PMR or PLMN system. In a further embodiment, when TETRA speech data is to be transferred to the PoC terminal participating in the TETRA-PoC speech group communications, the interworking device 510 stores the TETRA speech data items and then initiates establishment of PoC communication towards the PoC server system 520 (by transmitting an INVITE request or triggering usage of a pre-established PoC session). When a PoC session has been established or the pre-established PoC session is ready for speech data transfer, the speech data buffered in the memory may be retrieved, converted to the AMR format for PoC system and transmitted for the PoC voice group participants. In a further embodiment the converter 512 first converts the speech data items to another format, such as the AMR (adaptive multi-rate) applied in the GSM/GPRS network, before storing to the memory. This embodiment has the advantage that the speech conversion may be performed during the PoC session setup.

In one embodiment, a PoC client functionality is implemented in the device 510 comprising the TETRA-PoC converter 512 and 3GPP system compliant data transmission means. The client functionality may be provided by a computer program obtained from an external device or a memory. For more details on the PoC services in the 3GPP system, reference is made to the 3GPP report 3GPP TR 23.979, v. 6.2.0, *"Push-to-talk over Cellular (PoC) services; Stage 2 (Release 6)"*, June 2005. For instance, the device could function as the PoC user device in FIG. 5.3.1 of said report for establishing a PoC session (UE-A) or for receiving a PoC session request. For more details on communications between a PoC client and a PoC server and the general PoC architecture, reference is made to the OMA specification *"Push to talk over Cellular (PoC)—Architecture, Candidate Version* 1.0-05 Aug. 2005", 167 pages. The device 510 may be arranged to perform at least part of the procedures for control plane specified in Chapter 6 for PoC client in the OMA specification *"OMA PoC Control Plane, Candidate Version* 1.0-04 November 2005", 281 pages, and at least some of the procedures for user plane specified in the OMA specification *"OMA PoC User Plane, Candidate Version* 1.0-04 Nov. 2005", 167 pages.

The interworking device 510 may be arranged to apply voice and data communications procedures of TETRA mobile stations. A reference is made to the ETSI specification EN 300 392-1, *"Terrestrial Trunked Radio (TETRA); Voice plus Data (V+D); Part 1: General network design"*, V1.3.1 (2005-6). Annex E describes group call scenarios, and the interworking device 510 may be configured to support features described for the TETRA mobile station for providing TETRA side (infrastructure) group call signaling. Further, the ETSI specification EN 300 392-3-3 *"Terrestrial Trunked Radio (TETRA); Voice plus Data (V+D); Part 3: Interworking at the Inter-System Interface (ISI); Sub-part 3: Additional Network Feature Group Call (ANF-ISIGC)"*, V1.2.1 (2004-1) defining TETRA group call features enabling point to multipoint calls to be set-up between TETRA users located in more than one TETRA Switching and Management Infrastructure (SwMI), over the Inter-System Interface (ISI).

In one embodiment, the TETRA direct mode features are utilized in the interworking device 510. A reference is made to ETSI specification EN 300 396-3 *"Terrestrial Trunked Radio (TETRA); Technical requirements for Direct Mode Operation (DMO); Part 3: Mobile Station to Mobile Station (MS-MS) Air Interface (AI) protocol"*, V1.2.1 (2004-12). At least some of the specified layer 1, 2, and 3 functions may be used to arrange TETRA direct mode user and control plane functions. The interworking device 510 may be arranged to originate or respond to a point-to-point call or a group call which is established by the TETRA direct mode features. In the case of TETRA group calls, the inter-working device 510 is provided by a number common to all members of such group, the number being their group number by which the TETRA group members are addressed.

Besides system specific blocks and media data conversion functions by the converter 512, the interworking device 510 further comprises inter-system communication control features (which may be provided by a specific unit not shown in FIG. 5) to establish, release and otherwise control communications between the systems. Such control features may detect need for inter-system communication on the basis of signalling or media data message from a source system, and trigger establishment of communication capabilities in the target system. Further, such control features maintain identification information on the basis of which inter-system communications may be arranged and the logical communication flows in different systems be associated.

The control of inter-system communications between the TETRA and the PLMN systems may be arranged in the interworking device 510 in various ways. In one embodiment the interworking device 510 is arranged to prepare all received communications to the other system, if possible. Hence, if communications is desired from a source system to a target system, a group in which the interworking device 510 is a member is selected or formed in the source system. This embodiment is simple to implement, another possibility is to apply selective delivery of information between PLMN and PMR systems, which is illustrated in more detail below.

According to an embodiment, the interworking device 510 may provide transfer of inter-system control information. The device 510 may comprise mapping functions on the basis of which an appropriate PoC protocol specific message is established for a received TETRA signaling message, for instance.

In one embodiment, the TETRA-PoC interworking device 510 maintains inter-system group management information on the basis of which the TETRA-PoC communications is arranged. Such information may be stored in the memory of the interworking device 510 and used to arrange selective submission of inter-system communications. The interworking device 510 may maintain identification information on terminals and/or groups of terminals to which it needs to forward voice group communications. For instance, an identifier (which may be a user identifier) of the PoC client 530 may be associated in the interworking device 510 with one or more TETRA specific identifiers. Thus, the interworking device 510 may be automatically arranged to provide transmission of voice information from respective TETRA terminals 500 (of the group) also to the PoC system and destined to the PoC client 530. Other identifiers applicable in the interworking device 510 could be, for instance, an IMSI, a MSISDN, or another PoC system specific identifier (for instance a PoC session or group identifier). If inter-system communication is to be arranged with an individual user connected to the PoC system, an appropriate user identifier (MSISDN and/or SIP URI) may be defined and stored in the interworking device 510. For Instance, TETRA individual subscriber identifiers and/or group identifiers may be used to identify TETRA resources and/or terminals for Inter-system communications. Another applicable association mechanism is for instance identification of relevant (sub-)channels, which could be applied for an analogue PMR.

The interworking device 510 may be configured to check one or more predetermined identifiers in a received TETRA or PoC speech or data item, compare such identifier to stored identifiers defined as requiring inter-system transfer, and detect need for inter-system transfer if a match is found. A speech or data item originally associated with a source system identifier may then be converted and identified by an associated target system identifier, on the basis of which the Item can be transferred to the appropriate recipient in the target system. The identification information may be stored when the inter-system group is being formed, for instance based on inputs from the user identifying phone numbers or other identifiers of terminals 500, 530. In one embodiment identification information of relevant PoC client terminals 530 and associated TETRA terminals 17 is defined on the basis of group communications between the PoC client terminal 530 and the interworking device 510. For instance, inter-system participants may be defined during establishment of group communications by a specific identifier, on the basis of which the inter-working device 510 detects a need for inter-system transfer. Hence, ad-hoc inter-system groups may be pre-specified to the interworking device 510, in one embodiment by the inter-system identifiers. This information may be specifically stored in both directions, i.e. from PMR to PLMN and for PLMN to PMR. It is to be noted that the interworking device 510 may connect one or more other devices outside the group being formed in order to establish inter-system communications, for instance to define appropriate identifiers for the group participants in different networks.

Figure 6A:
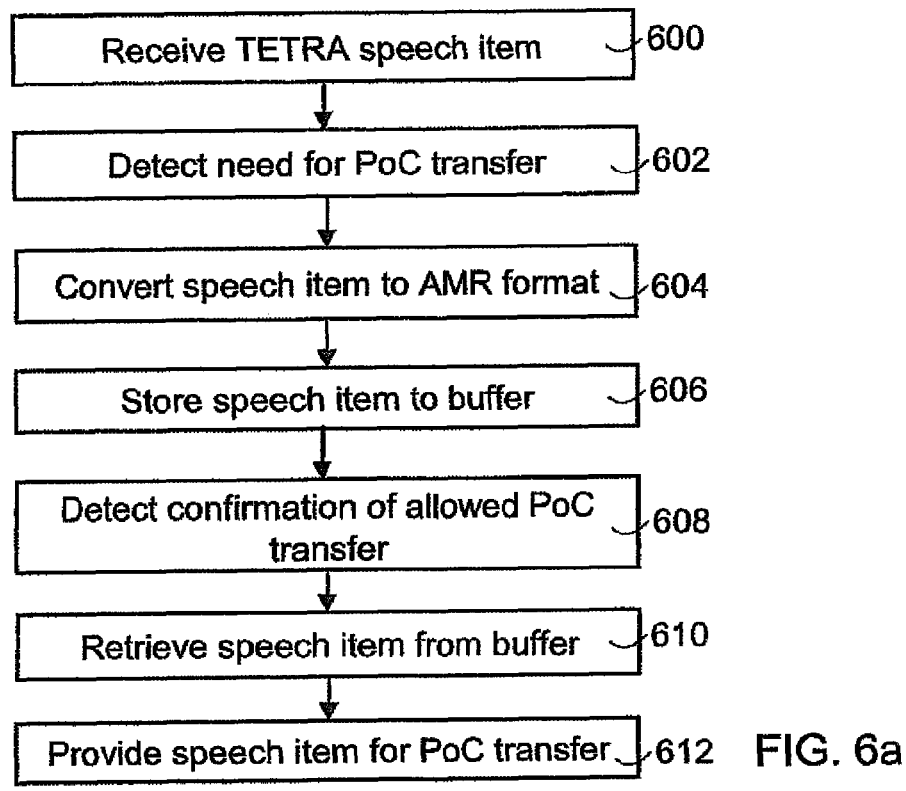
FIGS. 6a and 6b are flow charts illustrating a method according to an embodiment of the invention.
Figure 6B:
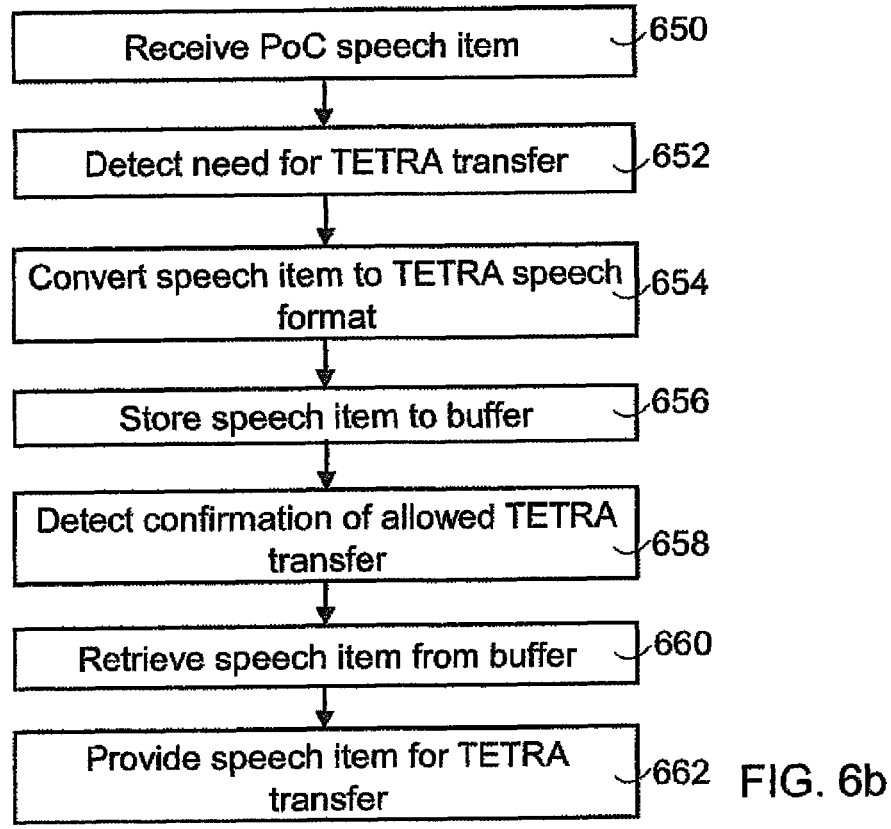

FIGS. 6a and 6b illustrate in more detail functions that may be applied in the TETRA-PoC interworking device 510. In step 600 one or more TETRA speech items are received and destined for a PoC terminals. For instance, the interworking device 510 may be configured to check, on the basis of pre-stored inter-system group management information, if the destination information of the TERRA speech item is associated (directly or indirectly) with any PoC system entities. If the speech item requires transmission to the PoC system, the need for PoC transfer is detected 602. Although not shown in FIG. 6a, the preparations for PoC transfer are preferably immediately initiated after detecting the need for PoC transfer. If the PoC functionality is separate from the (gateway) functionality implementing the features in FIG. 6a, there may be an additional step of submitting an indication of the need to establish PoC session or communications. On the basis of the indication or step 602, the PoC functionality initiates preparations for PoC transfer according to the PoC procedures, for instance by performing step 6 in the FIG. 5.3.1 in the above mentioned 3GPP specification TR 23.979.

In step 604 the speech item is converted to a format appropriate for PLMN transfer, in the present embodiment to AMR format specified to be used in the PoC voice group communications. The converted speech item is stored 606 to the buffer so that it is ready for immediate transfer when the converter device is allowed to transfer data to the PoC system.

In step 608 a permission to transfer data to the PLMN system is detected, in the present embodiment a confirmation of allowed PoC transfer is (received and) detected from the PoC server system 520. Thus, the speech item(s) associated with the PoC transfer (and the destined PoC client (UE-B)) is retrieved 610 from the buffer and provided for PoC transfer. The PoC functionality may then apply the PoC protocol procedures and the GSM/GPRS transmission services to transmit the speech item(s) to the PoC server system 520 for further delivery.

FIG. 6b illustrates group voice communications originated from the PoC system (the PoC client 530) to one or more TETRA terminals 500 of the TETRA system. In step 650 one or more PoC speech Items are received and destined for a PoC terminals. If the speech item is destined to one or more terminals 500 in the TETRA system, the need for TETRA transfer is detected 652. On the basis of the indication or step 652, the TETRA functionality initiates preparations for TETRA transfer according to the TETRA protocol procedures, for instance by preparing direct mode communications with one or more TETRA terminals 500.

In step 654 the speech item is converted to a format appropriate for TETRA transfer. The converted speech item is stored 656 to a buffer. In step 658 a permission or authorization to transfer data to the TETRA system is detected, and the speech item(s) destined to one or more TETRA terminals 500 are retrieved 660 from the buffer and provided 662 for TETRA transfer. The TETRA functionality may then apply already known TETRA protocol procedures to transmit the speech item(s) to the TETRA terminal(s) 500 and/or TETRA base station TBS for further delivery. For instance, features in the above-mentioned TETRA specifications may be applied.

It is to be noted that the procedure in FIGS. 6*a* and 6*b* is only one feasible implementation scenario and that the inter-system group voice communications may be arranged in other ways. For instance, the PoC functionality of the PoC client functionality in the interworking device 510 may already have established a pre-established PoC session, whereby the use of the buffer may be unnecessary and the converted speech item may be transferred to the PoC system by applying the procedures illustrated in FIG. 5.3.3 or 5.3.4 of said 3GPP specification TR 23.979.

According to an embodiment, a prioritisation system is applied in the group communications system and in the interworking device for prioritising some parties of the group members. As the device comprising the gateway block 410 or the TETRA-PoC converter 512 is considered as one member of the PMR (or PoC) voice communications group, it may be assigned with a higher priority than for other members. A higher priority may be defined for such interworking device 510 on the basis of a device identifier, for instance.

On the basis of the prioritisation setting, the interworking device 510 may be authorized to transfer voice data to the TETRA voice group if there are many group members wishing to transfer voice data. This embodiment enables to better provide resources for delivering group communications from members in another system. For instance, three PoC clients 530 may participate in the TETRA voice group and when the interworking device 510 delivering all traffic from these PoC clients 530 is prioritised in the TETRA speech communications, the PoC clients 530 may be provided with better chances to participate in the group voice communications. The interworking device 510 may be configured to apply already existing TETRA prioritisation features, some of which are described in the above-mentioned ETSI specification EN 300 392-3-3.

In one embodiment, the interworking device (510 in the embodiment of FIG. 5) may be configured to participate in communications to the PMR and/or PLMN system. For instance, the interworking device 510 may be a handheld device and the user of the device 510 could participate in the inter-system group communications. Thus, the interworking device 510 would be arranged to submit received speech items (in the inter-system communications from both systems) to the audio output means of the device 510 and arrange transmission of speech items detected from audio input means of the device 510.

According to an embodiment, VOX (voice-operated relay circuit) technology is applied to replace the usage of tangent for initiating speech transmission. Hence, no tangent would be required but the speech transfer is initiated on the basis of voice detection.

It is worth noticing that the interworking means illustrated above can be implemented in a single mobile communications device or as distributed in multiple devices, by a specific application or additional features in one or more control units of the device. In accordance with an embodiment, already existing PMR and PLMN functions are used in the interworking device for communication with other PMR and PLMN network elements, whereby no new standardized network operation and no new features are necessary to PMR or PLMN network elements.

Although embodiments related to voice group communications were illustrated above, the interworking device may be arranged to support transfer of other media formats between PMR and PLMN systems. It will be obvious to a person skilled in the art that as technology advances, the inventive concept can be implemented in various ways. For instance, the interworking device may be configured to support future development of PoC related standards, such as push-to-x enabling transfer of images and video. The invention and its embodiments are not limited to the examples described above but may vary within the scope of the claims.

The invention claimed is:

1. A communications device for inter-system communications the communications device comprising:
    a private mobile radio PMR communications unit for PMR communications with a PMR system element,
    a public land mobile network PLMN communications unit for PLMN communications with a PLMN system element, and
    a converter for performing conversion between PMR communications and PLMN communications, wherein the converter is arranged to perform, for an information unit requiring inter-system transfer, a conversion between a format used for PMR communications and a format used for PLMN communications, wherein
    the communications device is arranged to buffer the converted information unit or the information unit requiring inter-system transfer,
    the communications device is arranged to request establishment of a communications session or an authorization for data transfer to a target system part,
    the communications device is arranged to transmit the converted information unit via the target system part as a response to receiving an authorization to transfer,
    the communications device is arranged to function as a member of a communications group and the communications device is arranged to prioritize the communications device over other group members of the communications group.

2. A communications device according to claim 1, wherein the communications device is arranged to detect the need for inter-system transfer on the basis of a message received from a source system comprising a source system communications identifier which is associated in the communications device with at least one target system communications identifier.

3. A communications device according to claim 1, wherein the communications device is arranged to provide inter-system group communications between one or more PLMN system elements and one or more PMR system elements.

4. A communications device according to claim 3, wherein the communications device is arranged to maintain inter-system group information associating group members, and
    the communications device is arranged to determine one or more recipient group members requiring inter-system communications on the basis of the inter-system group information.

5. A communications device according to claim 3, wherein the PMR communications unit is arranged to transmit and receive TETRA voice group communications and the PLMN communications unit is arranged to transmit and receive PoC voice group messages, and the converter is arranged to perform protocol conversion between TETRA speech coding format and PoC speech coding format.

6. A method of arranging interworking for a communications system comprising a private mobile radio PMR system part, a public land mobile network PLMN system part, and a mobile intermediate device capable of communicating with the PMR system part and the PLMN system part and comprising a converter for performing conversion for communications between the PMR system part and the PLMN system part, the method comprising:

detecting in the intermediate device a need for inter-system transfer from a source system part to a target system part, performing by the converter conversion for an information unit from the source system part to a format appropriate in the target system part; and transmitting the converted information unit to the target system part, wherein the converted information unit or the information unit requiring inter-system transfer is buffered by the intermediate device, establishment of a communications session or an authorization to transfer an information unit via the target system part is requested, and the converted information unit is transmitted via the target system part as a response to receiving an authorization, wherein the intermediate device functions as a member of a communications group and the intermediate device is prioritized over other members of the communications group.

7. A method according to claim 6, wherein the method is applied for transferring speech items of group voice services between the PLMN system part and the PMR system part.

8. A method according to claim 6, comprising maintaining in the system inter-system group information associating group members reachable via the source system part and the target system part, and determining one or more recipient group members reachable by the target system part on the basis of the inter-system group information.

9. A communications system comprising:

a private mobile radio PMR unit for PMR communications, a public land mobile network PLMN unit for PLMN communications, a mobile converter unit for performing conversion between the PMR communications and PLMN communications, wherein the mobile converter unit is arranged to perform, for an information unit requiring inter-system transfer, a conversion between a format used by the PMR unit and a format used by the PLMN unit, wherein the system is arranged to buffer the converted information unit or the information unit requiring inter-system transfer, the system is arranged to request establishment of a communications session or a an authorization to transfer an information unit via the target system part, the system is arranged to transmit the converted information unit via the target system part as a response to receiving an authorization, a communications device comprising the mobile converter unit is arranged to function as a member of a communications group, and the system is arranged to prioritize the communications device over other members of the communications group.

\* \* \* \* \*